United States Patent [19]
Dodd

[11] Patent Number: 6,018,703
[45] Date of Patent: *Jan. 25, 2000

[54] SOFTWARE SELECT AND TEST

[75] Inventor: Robert W. Dodd, Palo Alto, Calif.

[73] Assignee: Space Systems/Loral, Inc., Palo Alto, Calif.

[ * ] Notice: This patent is subject to a terminal disclaimer.

[21] Appl. No.: 09/099,154

[22] Filed: Jun. 18, 1998

Related U.S. Application Data

[62] Division of application No. 08/891,491, Jul. 11, 1997, Pat. No. 5,781,456.

[51] Int. Cl.[7] .................................................. G05B 23/02
[52] U.S. Cl. ............................. 702/113; 702/57; 330/278
[58] Field of Search .............................. 702/117, 57–66; 701/13; 330/305, 307, 278, 279, 284; 327/552–559

[56] References Cited

U.S. PATENT DOCUMENTS

| | | | |
|---|---|---|---|
| 4,541,065 | 9/1985 | Faulkner et al. | 702/87 |
| 5,625,316 | 4/1997 | Chambers et al. | 327/553 |
| 5,781,456 | 7/1998 | Dodd | 364/579 |

*Primary Examiner*—Kamini Shah
*Attorney, Agent, or Firm*—Kenneth W. Float

[57] ABSTRACT

A software-controlled select and test system for use with a spacecraft. The system reduces the assembly, integration, test time and improves performance of the payload and spacecraft by optimizing the performance using standardized algorithms. The system also reduces the DC power required by the spacecraft, and the thermal dissipation, battery size, solar array size and mass of the spacecraft. This is achieved by optimizing traveling wave tube amplifiers for each channel instead of meeting minimum power requirement over the entire range, wherein most channels have excess power. A serial interface adapter performs the optimization functions via software.

9 Claims, 2 Drawing Sheets

TWT POWER CONTROL

SOFTWARE SELECT AND TEST

CROSS REFERENCE TO RELATED APPLICATIONS

This application is a divisional application of prior application Ser. No. 08/891,491, filed on Jul. 11, 1997 now U.S. Pat. No. 5,781,456.

BACKGROUND

The present invention relates generally to select and test systems, and more particularly, to a software-based select and test system for use with spacecraft.

Heretofore a large portion of the time allocated to payload and spacecraft integration involves manual adjustments and hand selection of alternative components that optimize the performance of analog and RF circuits. This operation is referred to as a select and test operation. Conventional select and test operations use factory selected components installed during assembly, integration and test or use a limited number of switched components. The select and test operation requires specially skilled personnel and expensive test equipment. An error or out-of-specification response encountered during an acceptance test operation requires replacement of the out-of-specification circuits and retesting of the payload to high reliability standards due to the fact that the electrical path was broken by making a hardware change.

It would therefore be an advantage to have a software-based select and test system for use with a spacecraft that eliminates the need to replace or manually solder components and attenuators to implement select and test operations, and has the added advantage of reducing the power and thermal dissipation requirements of the spacecraft.

SUMMARY OF THE INVENTION

To meet the above and other objectives, the present invention provides for a software-based or software-controlled select and test system that provides two major improvements when it is employed with a spacecraft. The software-based select and test system reduces the assembly, integration, test time and improves performance of payload and spacecraft. The time savings is achieved by eliminating the need to replace coaxial attenuators and manually solder components, by using computer-controlled optimized performance established by standardized algorithms.

The software-based select and test system also provides for reduced thermal dissipation, battery size, solar array size and mass resulting from the five percent reduction in required payload power. This savings is achieved by optimizing traveling wave tube amplifiers for each specific channel instead of meeting minimum power requirement over the entire range, wherein most of the channels have excess power. Prior traveling wave tube amplifiers did not have this flexibility for a precise change in RF power achieved using anode control as is provided by the present invention.

A serial interface adapter has been developed by the assignee of the present invention provides the capability to economically perform the optimization functions using software. The present invention dramatically increases the number of spacecraft that can be inventoried and by reducing the payload power by approximately five percent by improving the payload performance on a detail level that is not possible with manual methods.

Thus, the present select and test system replaces fixed select and test resistors with computer controlled operational amplifiers that provide breakpoints, variable gain and temperature compensation functions. Power and frequency optimization is provided by the present invention. Significant improvements in payload performance are achieved by optimizing for a specific channel over temperature instead of optimizing payload performance over the entire bandwidth prior to spacecraft integration, which involves many compromises.

On a spacecraft that is restricted to a limited number of channels based on placement of traveling wave tubes, improved performance is achieved due to the reduced range for that location and is then reset for alternative channels. A key element of this is the power from the traveling wave tube amplifier which may be adjusted by changing its anode voltage. Limited frequency changes may also be implemented by changing the cathode voltage. The traveling wave tube amplifier is typically set for the worst case to meet specification which is not required for the majority of the channels, There is typically a 0.4 dB variation between the center of channel and the end. Reducing the power of the traveling wave tube amplifier for channels in the center reduces the payload power by approximately five percent (0.21 dB).

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
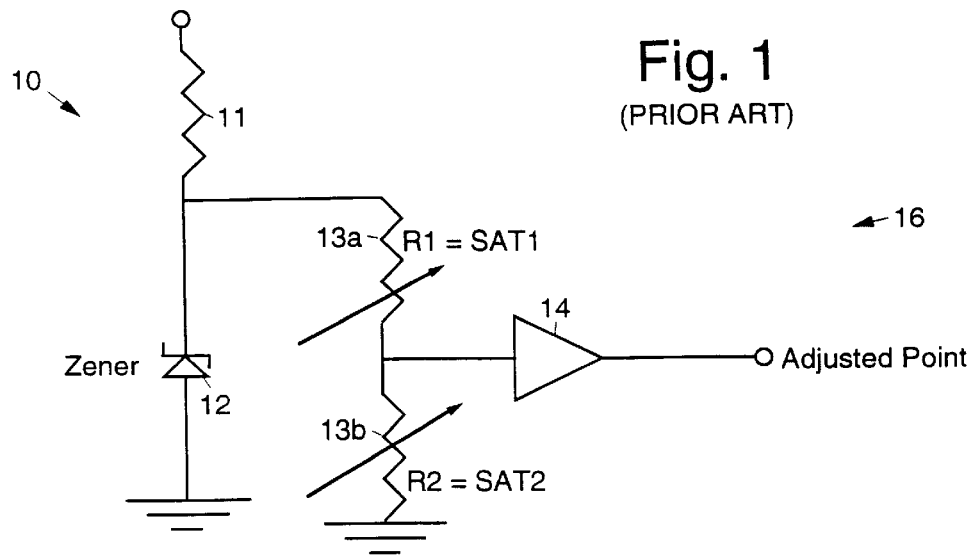
FIG. 1 illustrates a conventional hardware select and test circuit.

Referring to the drawing figures, FIG. 1 illustrates a conventional hardware select and test circuit 10. The hardware select and test circuit 10 includes a resistor 11 and Zener diode 12 serially coupled between a voltage source and ground. Two serially coupled variable resistors 13a, 13b are coupled from a point between the resistor 11 and Zener diode 12 and ground. An operational amplifier 14 is coupled to a point between the variable resistors 13a, 13b. The output of the operational amplifier 14 provides an adjusted operating point resulting from manually adjusting the variable resistors 13a, 13b.

Electronic units disposed on a spacecraft (generally designated as spacecraft 16) require select and test alignment to establish the appropriate gain, temperature compensation and bias that provides for optimum performance of the electronic units. The electronic units include but are not limited to receivers, upconverters, downconverters, low noise amplifiers, linearizers, solid state power amplifiers, traveling wave tube (TWT) amplifiers (TWTA) in the payload and the amplifiers, comparitors, motor drivers, heater drivers, etc. in the bus equipment. Conventionally, such alignment is achieved by manually adjusting the variable resistors 13a, 13b. A typical select and test operation involves at least one and generally two select and test devices (the variable resistors 13a, 13b). Analog circuits are generally modified for operation using an adjustable voltage.

Figure 2:
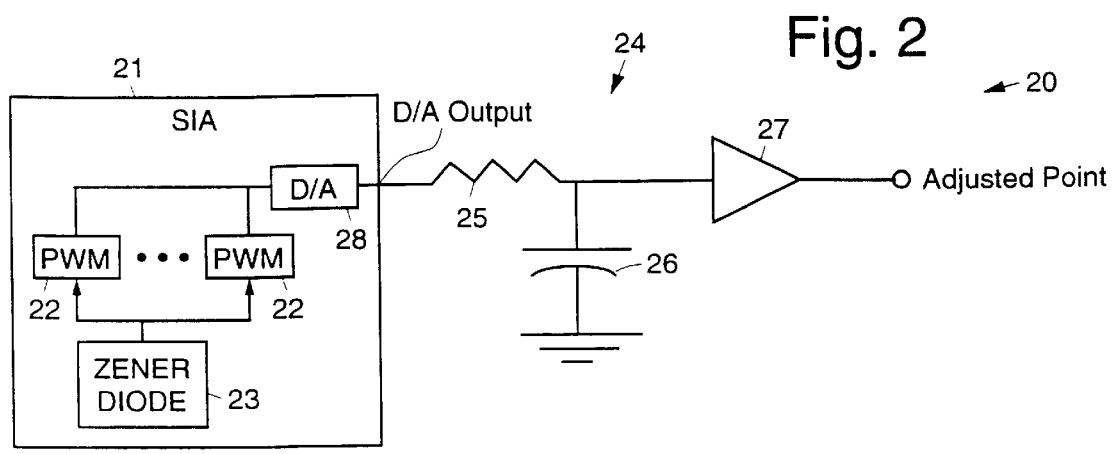
FIG. 2 illustrates a software-based select and test circuit in accordance with the principles of the present invention.

Referring now to FIG. 2, it illustrates a software-based select and test circuit 20 in accordance with the principles of the present invention. A serial interface adapter (SIA) 21 developed by the assignee of the present invention provides the capability to economically perform select and test functions in software. The serial interface adapter 21 has ten precision-controlled pulse width modulators (PWM) 22 that can vary their output in 1/1024 increments. The serial interface adapter 21 also includes a precision voltage reference 23 (Zener diode). The output of the serial interface adapter 21 is provided by a digital to analog converter (D/A) 28, when filtered using filter 24, such as is provided by a resistor 25 and capacitor 26, for example, provides for a precision software-controlled output voltage which is applied to an operational amplifier 27. The output of the operational amplifier 27 is an adjusted operating point for a selected electronic unit.

The select and test values for the electronic unit are automatically established by automatic test equipment coupled to the serial interface adapter 21 that varies the values for optimum performance. This totally eliminates the need for manual soldering or manual adjusting of components in the electronic unit to provide for select and test functions.

Figure 3:
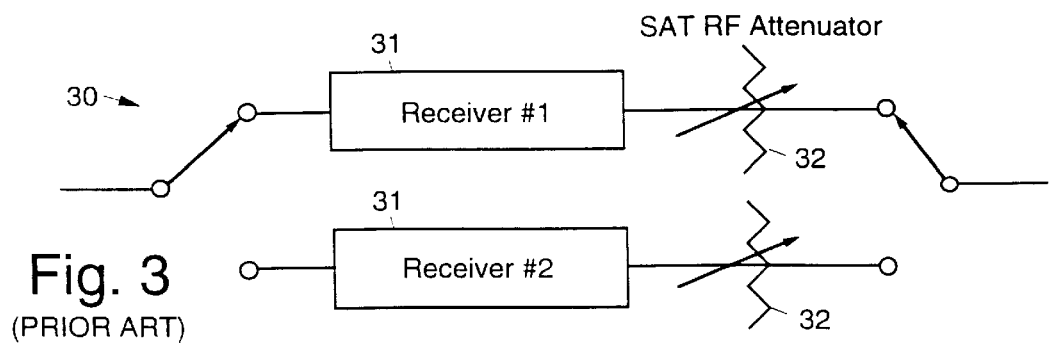
FIG. 3 illustrates a conventional RF select and test circuit.

Referring now to FIG. 3, it illustrates a conventional RF select and test circuit 30. At the spacecraft and panel, the conventional RF select and test operation includes making RF measurements and changing manually adjusted attenuators 32 to obtain the optimum performance and to prevent excessive power from destroying an electronic unit. A basic implementation is shown in FIG. 3, where the outputs of two receivers 31 are balanced using RF attenuators 32 coupled to outputs of the respective receivers 31. The receivers 31 are adjusted to have the same gain so that the electronic unit operates the same when either one of the receivers 31 is used.

Figure 4:
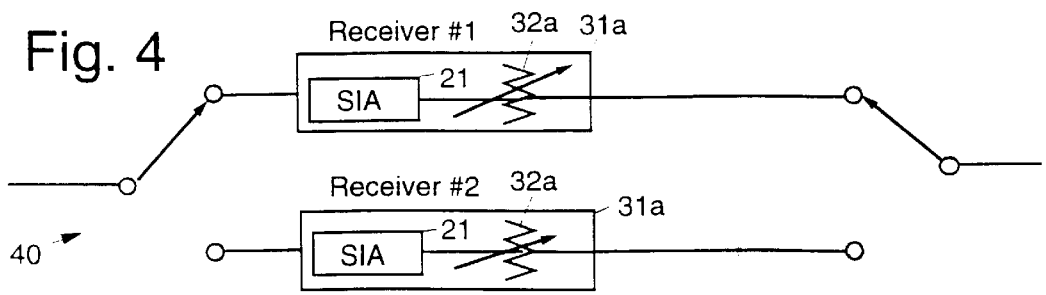
FIG. 4 illustrates an RF select and test circuit in accordance with the principles of the present invention.

FIG. 4 illustrates an RF select and test circuit 40 in accordance with the present invention. The RF select and test is performed by software when an attenuator 32a is incorporated n the RF unit. An RF computer-controlled attenuator 32a is employed in channel amplifiers used in the present invention. The serial interface adapter 21 performs the gain adjustment function by way of a serial bus that was previously performed by manually replacing alternative coaxial attenuators. The addition of the computer-controllable attenuators 32a in the receiver 31a allows the entire system to be optimized, thus improving performance over the previous operation. It is also extremely fast and does not require the RF path to be broken in order to establish to optimum performance during assembly integration and test alignment.

Almost all of the payload power for a typical communication satellite or spacecraft 16 is established by the DC power supplied to traveling wave tube amplifiers used in the payload. The traveling wave tube amplifiers are designed to provide a minimum value of output power over a predetermined frequency range. Electronic units also have lower insertion loss than the specified value so that the satellite or spacecraft 16 typically has a higher power output than is required, and which is on the order of at least 0.1 dB total.

Figure 5:
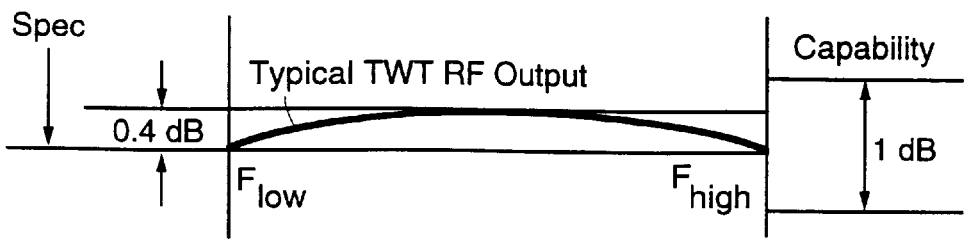
FIG. 5 is a graph illustrating the RF response versus frequency of a traveling wave tube amplifier.

FIG. 5 shows a typical graph of output power versus frequency for a traveling wave tube amplifier employed in a communications link. The output power is typically 0.4 dB higher than is required in the center of the band. If it is assumed that the average is 0.2 dB higher over the band, 4.5 percent extra power may be gained by lowering the power output of the traveling wave tube amplifier to the specification level at the frequency of operation. This value increases to 5 percent if the electronic units are on average better than specification. The savings derived from this change is about 3 million dollars for a typically high power communications satellite.

The power can be lowered if the requirement is to meet the specification using the redundant electronic unit. This typically requires a higher power in the primary path to assure adequate power in the redundant path which has higher losses due to extra switches and waveguide or coaxial feeds, for example. On the other hand, there are times when the losses are greater than anticipated and the spacecraft 16 does not meet the specification by a small amount. This requires changing the electronic unit or generating paperwork to justify the delivery of an electronic unit with less than specified performance. This problem may be resolved by this computer controlled anode control.

Figure 6:
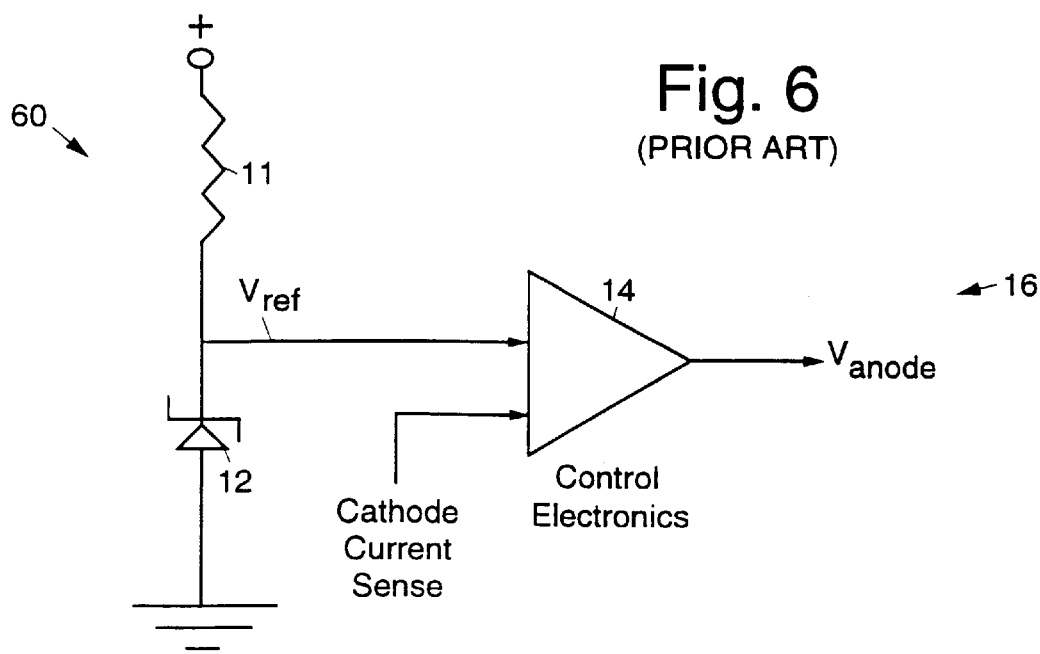
FIG. 6 illustrates a conventional traveling wave tube amplifier anode control circuit.

The traveling wave tube amplifier incorporates an anode regulator. The RF power output of the traveling wave tube amplifier is mathematically proportional to beam current. The anode regulator senses the beam current to maintain a constant power output. The output power therefor may be adjusted by changing the beam current. FIG. 6 shows a block diagram of a conventional anode control circuit 60 of a traveling wave tube amplifier, which is similar to the conventional select and test circuit 10 used to adjust the reference voltage. Conventional traveling wave tube amplifier adjustments have been primitive, typically allowing only a one level change by incorporating additional transformers. This arrangement produces a large change (typically 3 dB) in output.

Figure 7:
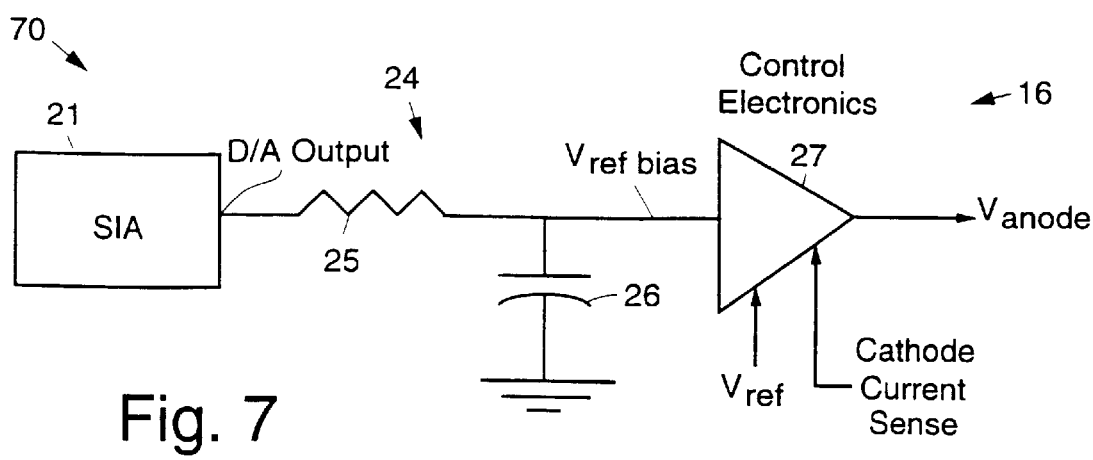
FIG. 7 illustrates a traveling wave tube amplifier anode control circuit in accordance with the principles of the present invention.

FIG. 7 illustrates a software-based traveling wave tube amplifier anode control circuit 70 in accordance with the principles of the present invention. The anode control circuit 70 comprises a serial interface adapter (SIA) 21 described above with reference to FIG. 2. The output of the serial interface adapter 21 is filtered using a filter 24, provided by the resistor 25 and capacitor 26, for example, produces a precision software-controlled output voltage that is applied to the operational amplifier 27. The output of the operational amplifier 27 is an adjusted operating point for a selected electronic unit. The output of the filter circuit 24 provides a bias voltage ($V_{ref\ bias}$) that is also employed in the anode control circuit 70 that augments the reference voltage ($V_{ref}$), thus allowing the RF power output to be changed. Selection and control of the operating point (i.e., the RF power output) is performed at a ground station by way of the serial interface adapter 21.

Thus, a software-based or software-controlled select and test system for use with spacecraft has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A software-controlled select and test system for use with a spacecraft, characterized by:

said spacecraft comprising a plurality of controllable units;

a plurality of interface adapters each comprising circuitry that varies its output in a controlled manner in response software-controlled inputs, and wherein control of the circuitry provides an output that is used to adjust the controllable units to optimize the performance thereof.

2. The select and test system as recited in claim 1, wherein the plurality of serial interface adapters each comprise a plurality of controllable pulse width modulators that vary their output in a controlled manner in response software-controlled inputs, and wherein control of the pulse width modulators provides for an output voltage that is used to adjust a respective electronic unit to optimize the performance thereof.

3. The select and test system as recited in claim 1, comprising a plurality of amplifiers as electronic units;

a plurality of control circuits that each comprise a control voltage input for receiving a control voltage from said pulse width modulator of the serial interface adapter and an output that adjusts an operating point of the respective amplifier.

4. The select and test system as recited in claim 1, comprising a plurality of receivers that are individually coupled to a respective plurality of computer-controllable attenuators; and wherein control of the pulse width modulators of each serial interface adapter provides for an output voltage that adjusts an operating point of the computer-controllable attenuator that in turn adjusts the gain of the respective receiver.

5. The select and test system as recited in claim 1, comprising a plurality of traveling wave tube amplifiers as electronic units;

a plurality of anode control circuits that each comprise a reference voltage input for receiving a reference voltage, a cathode current sense input for sensing the current supplied to the cathode of the amplifier, and a control voltage input for receiving a control voltage;

said plurality of serial interface adapters being individually coupled to the respective anode control circuits, and wherein each serial interface adapter outputs a control voltage that is coupled to the respective control voltage input of the anode control circuit that adjusts an operating point of the anode the respective traveling wave tube amplifier; and a bias voltage respectively coupled to the control voltage input of the respective anode control circuit that augments the reference voltage to vary the RF power output of the respective traveling wave tube amplifier;

and wherein RF power output is controlled by way of the serial interface adapter.

6. The select and test system as recited in claim 1, wherein the controllable electronic units are controlled from a ground station by way of the serial interface adapter.

7. The select and test system as recited in claim 3, wherein the operating point of each respective amplifier is adjusted using select and test values transmitted from a ground station by way of the serial interface adapter.

8. The select and test system as recited in claim 5, wherein the gain of each respective amplifier is adjusted using select and test values transmitted from a ground station by way of the serial interface adapter.

9. The select and test system as recited in claim 4, wherein the RF power output of each respective amplifiers is adjusted using select and test values transmitted from a ground station by way of the serial interface adapter.

* * * * *